United States Patent [19]

Guido

[11] Patent Number: 4,720,838
[45] Date of Patent: Jan. 19, 1988

[54] CONTACT CONNECTION BETWEEN A CONTACT ELECTRODE AND A COOLING MEDIUM AND A CURRENT SUPPLY LINES FOR AN ELECTRICAL MELTING FURNACE

[75] Inventor: Heinz Guido, Duisburg, Fed. Rep. of Germany

[73] Assignee: MAN Gutehoffnungshütte GmbH, Fed. Rep. of Germany

[21] Appl. No.: 915,223

[22] Filed: Oct. 3, 1986

[30] Foreign Application Priority Data

Oct. 5, 1986 [DE] Fed. Rep. of Germany ....... 3535689

[51] Int. Cl.$^4$ .............................................. H05B 7/00
[52] U.S. Cl. ...................................................... 373/72
[58] Field of Search ................... 373/72, 108; 339/15, 339/16 R, 16 RC, 112 R, 112 L

[56] References Cited

U.S. PATENT DOCUMENTS 3,187,292 6/1965 Small et al. ...................... 339/112 R
4,435,812 3/1984 Guido et al. .......................... 373/72

Primary Examiner—Roy N. Envall, Jr.
Attorney, Agent, or Firm—McGlew and Tuttle

[57] ABSTRACT

The contact connection of the contact electrode of an arc or resistance melting furnace with the supply terminal there is arranged at the base plate of the contact electrode a contact pipe which engages into a contact sleeve at the supply terminal includes a contact sleeve which is pressed against the contact pipe by means of a press-on desk.

6 Claims, 2 Drawing Figures

CONTACT CONNECTION BETWEEN A CONTACT ELECTRODE AND A COOLING MEDIUM AND A CURRENT SUPPLY LINES FOR AN ELECTRICAL MELTING FURNACE

BACKGROUND OF THE INVENTION

1. Field of the Invention

This invention relates in general to the construction of electrical melting furnaces and in particular to a new and useful contact connection of the contact electrode of an arc or resistance melting furnace.

The contact electrodes in the direct current arc furnace (e.g. per DE-PS No. 31 06 741) are subject to wear earlier than the hearth liner. As relatively much labor is required to change the individual contact rods, the method has been adopted in the practice to change all contact rods jointly at corresponding intervals of time.

This changing is done preferably by lifting the bottom electrode in one piece out of the furnace tank and replacing it by a new one. For this operation it has heretofore been necessary to detach the current cables and the means for coolant supply from the bottom electrode.

The drawback of this procedure is that the current cables, due to their weight, are difficult to handle. For larger plants even erectio equipment is necessary. Moreover, the work is bothersome due to the radiant heat of the furnace floor.

To simplify and accelerate the work and to reduce the strain on the personnel, it has been proposed before to design the contact electrode so that the bottom electrode and current cable terminal can be separated from one another and hence the current cables and coolant supply lines can remain mounted.

The contact point constitutes the connection between the current cable terminal and the contact electrode. It must be suitable for conduction of the electric current and it must guide the coolant on into the bottom electrode.

This can be done in that the current cable terminal is secured on the furnace tank and has at its top side a contact point for connection to the contact electrode. Hence for removal of the contact electrode now the contact point between terminal and contact electrode must be separated. Current cables and coolant supply lines remain at the terminal, which itself is secured on the furnace tank.

SUMMARY OF THE INVENTION

The invention provides a contact connection between the contact electrode and the supply terminal of an arc or resistance furnace which is simple in its structural design, easy to handle and establishes a reliable contact.

The contact connection according to the invention has the above advantages and the further special feature that even after repeated changing of the contact electrode the contact means at the supply terminal are reusable.

Accordingly, it is an object of the invention to provide an improved contact connection with a contact electrode of an arc or resistance melting furnace which includes a supply terminal connected to the base plate of the contact electrode by a contact pipe which engages into a contact sleeve of a supply terminal which is pressed against the contact pipe by means of a press on disk.

A further object of the invention is to provide a contact connection or a contact electrode which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

GENERAL DESCRIPTION OF THE PREFERRED EMBODIMENTS

Figure 1:
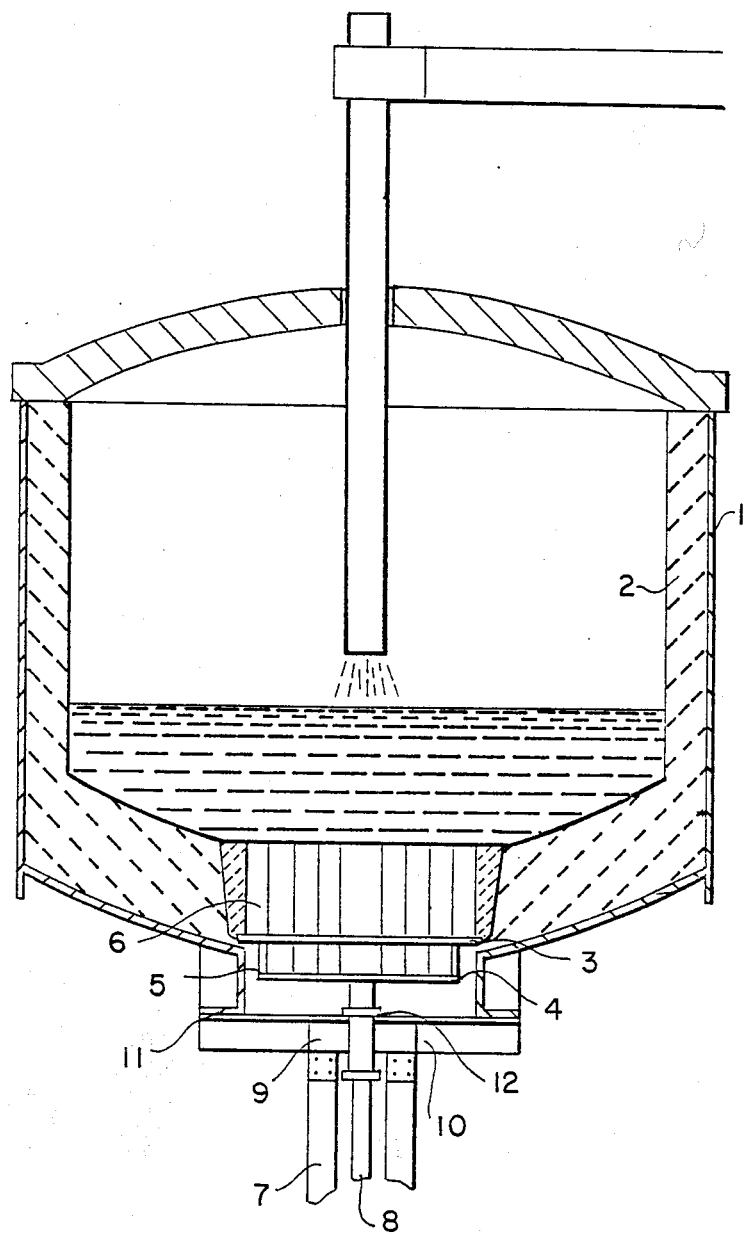
FIG. 1 is a section through an arc furnace tank constructed in accordance with the inventions.

Referring to the drawings in particular, the invention embodied therein comprises a contact connection for the contact electrode of an arc or resistance melting furnace 1 which includes a base plate 4 which is connected at a space location from and to a support plate 3 which fits in an opening of the furnace 1 and its bottom. In accordance with the invention a base plate 4 carries a contact pipe 13 which is connected to a contact sleeve 14 of a supply terminal 9 which carries both electrical conduits 7 and a conduit for a coolant 8. Conical sleeve is held in a position by a press-on disk 15 which is tightened against a wall of the conical sleeve so as to cause it to bear tightly against the contact pipe 13.

FIG. 1 shows the furnace vessel 1 with the refractory liner 2 in the interior. In the center of the furnace bottom can be seen the contact electrode, comprising a support plate 3, base plate 4, contact rods 5 and refractory tamping 6. The current cables 7 and coolant supply lines 8 are fastened on the supply terminal 9. Below the furnace tank a yoke 10 is arranged, which is equipped to receive the supply terminal 9. Between the yoke 10 and the furnace tank an insulation 11 is installed.

Figure 2:
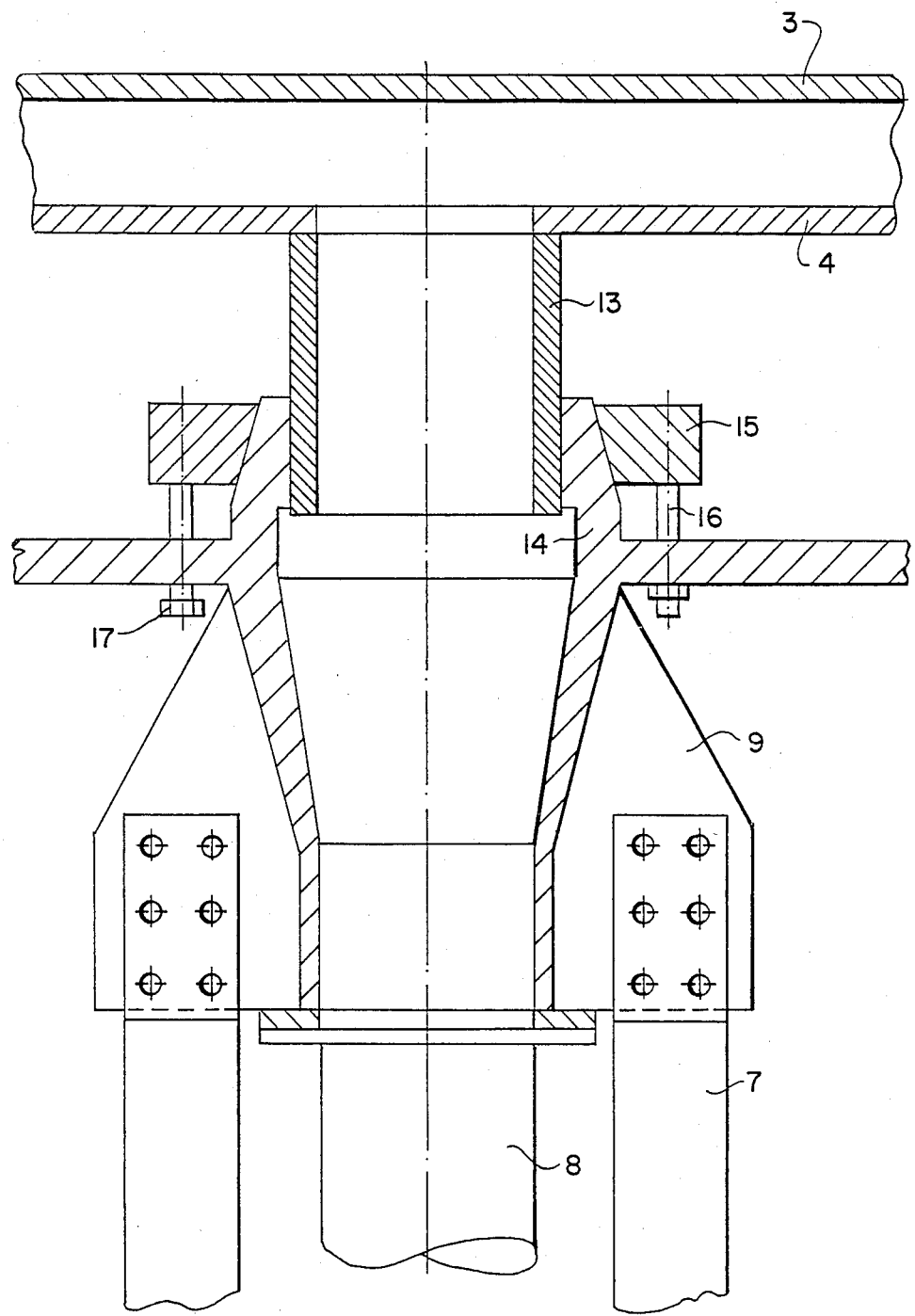
FIG. 2 is a section of the contact connection on a larger scale.

The contact connection 12 (per FIG. 1) is shown as a detail in FIG. 2. A contact pipe 13 is fastened on the base plate 4. This contact pipe 13 projects into an externally conical contact sleeve 14. A press-on or pressure disk 15 is applied by means of tightening screws 16 onto the contact sleeve and creates the contact pressure between contact pipe 13 and contact sleeve 14 necessary for current flow. For detaching the press-on disk 15, forcing screws 17 are provided.

While specific embodiments of the invention have been shown and described in detail to illustrate the application of the principles of the invention, it will be understood that the invention may be embodied otherwise without departing from such principles.

What I claimed is:

1. A contact connection between a contact electrode and the supply terminal for current and coolant lines of an electric melting furnace, comprising a contact electrode having a base plate, a contact pipe extending outwardly out of said base plate, and a contact sleeve into which said pipe is fitted, said contact sleeve being a part of a current and coolant conduit assembly, and a press-on disk fitted against said contact sleeve to urge it into electrical connection contact with said contact pipe.

2. A contact connection according to claim 1 wherein said contact sleeve has a male taper, the press-on disk having a female taper engaged on the taper of said sleeve.

3. A contact connection according to claim 1 including tightening screws engaged through said contact sleeve and into said disk and tightening said disk against said sleeve.

4. A contact connection according to claim 1 wherein said contact sleeve includes wedge means urging it into contacting engagement with said contact pipe.

5. A contact connection between a contact electrode and a supply terminal for electric current and coolant lines of an electric melting furnace, comprising: a contact electrode having a support plate and a base plate; a contact pipe, connected to said base plate and having a contact pipe portion extending outwardly out of said base plate, said contact pipe portion extending outwardly having an electrical contact surface; a contact sleeve, having an outer conical shape forming a male taper and an inner electrical contact surface, said contact pipe being fitted in said contact sleeve, said contact sleeve being part of a current and coolant conduit assembly; an annular pressure disc, having an inner conical surface forming a female taper, said pressure disc being fitted against said contact sleeves so said female taper of said pressure disc engages said male taper of said contact sleeve so as to urge the contact sleeve inner electrical contact surface into electrical connection contact with said outwardly extending contact surface of said contact pipe.

6. A contact connection according to claim 5 further comprising: tightening screws engaged through said contact sleeve and into said disc and tightening said disc against said sleeve.

* * * * *